United States Patent [19]

Crees

[11] 4,052,879

[45] Oct. 11, 1977

[54] CABLE BENDER

[76] Inventor: Silas R. Crees, Eau Gallie, Fla. 32935

[21] Appl. No.: 719,314

[22] Filed: Aug. 31, 1976

Related U.S. Application Data

[62] Division of Ser. No. 581,035, May 27, 1975, Pat. No. 3,988,918, which is a division of Ser. No. 434,365, Jan. 17, 1974, Pat. No. 3,888,101.

[51] Int. Cl.² .................................................. B21D 7/024
[52] U.S. Cl. ........................................ 72/318; 72/388; 72/453.15; 72/457
[58] Field of Search .................. 72/318, 319, 321, 309, 72/310, 316, 298, 387, 388, 389, 457, 458

[56] References Cited

U.S. PATENT DOCUMENTS

| 3,584,493 | 6/1971 | Crees | 72/453.15 |
| 3,613,430 | 10/1971 | Crees | 72/388 |
| 3,786,668 | 1/1974 | Crees | 72/318 |
| 3,813,914 | 6/1974 | Hagemeyer | 72/318 |
| 3,861,186 | 1/1975 | Wigner | 72/217 |
| 3,924,438 | 12/1975 | Linquist | 72/388 |

Primary Examiner—C.W. Lanham
Assistant Examiner—Gene P. Crosby
Attorney, Agent, or Firm—Duckworth, Hobby & Allen

[57] ABSTRACT

A cable bender includes two bending members rotatably joined together about a common pivot axis, one of the bending members having a hydraulic cylinder associated therewith such that force may be applied causing the piston shaft of the cylinder to extend and cooperate with a tie arm extending between the bending members to drive one of the bending members in a curved path about the pivot axis.

3 Claims, 6 Drawing Figures

CABLE BENDER

This application is a division of application Ser. No. 581,035, filed May 27, 1975, now U.S. Pat. No. 3,988,918, which application was a division of application Ser. No. 434,365, filed Jan. 17, 1974, now U.S. Pat. No. 3,888,101.

BACKGROUND OF THE INVENTION

1. Field of the Invention

The present invention relates to cable and conduit benders and the like.

2. Description of the Prior Art

A wide variety of hand-operated conduit and cable benders are disclosed in the prior art. In U.S. Pat. No. 475,261, Winton discloses a trolley wire bender having spaced cable shoes and a bending member rotated about a pivot axis between the shoes in order to effect bending. Safranski, in U.S. Pat. No. 2,709,382, teaches a portable tube bender having two levers pivoted on a common axis, one of the levers including an outer shoe which moves around the periphery of a grooved wheel fixed to the other lever, to cause bending of tubing fitted across that periphery.

Another variety of tube and cable benders employs a fixed lever having a curved mandrel at one end. Another lever having a bending shoe opposing the mandrel is rotatably joined to the fixed lever, with the workpiece extending across the periphery of the mandrel in between the two levers. Bending is effected by rotating the second lever toward the first, causing the bending shoe to bend the workpiece around the periphery of the mandrel. Examples of this type of device are disclosed in the following U.S. Pat. Nos: 3,750,447 to Kowal et al.; 3,051,218 to Franck; 3,194,038 to Small et al.; 2,908,193 to Gryniewicc; 3,685,335 to Kowal; and 3,380,283 to Wilson et al.

Other prior art references of interest include the following U.S. Pat. Nos: 3,662,580 to Power; 1,868,852 to Schneider; 1,794,689 to Holsclaw et al.; and 1,075,837 to Malo et al.

SUMMARY OF THE INVENTION

The present invention contemplates a cable bender comprising two bending members rotatably joined together about a common pivot axis, with means for rotating one of the bending members about the pivot axis. The rotating means comprises a lever coupled to one of the bending members, with means for fixing the lever in a set position when rotational force is applied in one direction, and allowing the lever to rotate freely when rotational force is applied in a direction opposite to the one direction.

THE DRAWING

DETAILED DESCRIPTION

Figure 1:
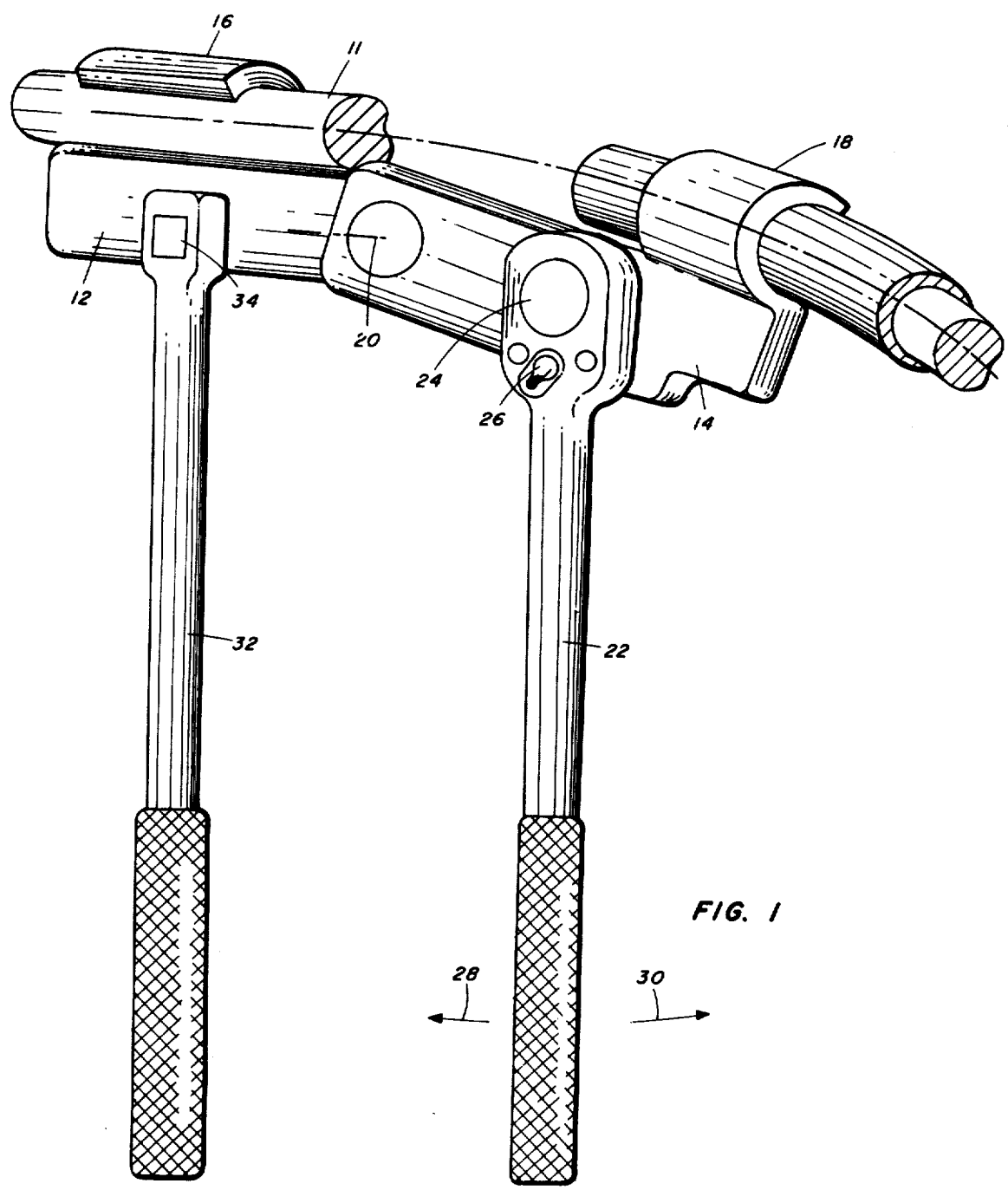
FIG. 1 is a perspective view of one embodiment of a cable bender in accordance with the present invention.

A first embodiment of a cable bender in accordance with the present invention will be described with reference to FIG. 1.

A cable bender, referred to generally as 10, includes two bending members 12 and 14 rotatably joined together about a common pivot axis 20. Each bending member includes a respective cable shoe 16 and 18 for holding the cable 11 against bending members 12 and 14. Each bending member-cable shoe combination may be integrally formed. The size, shape and dimensions of the bending members are not critical, and may be fabricated from a variety of high tensile strength materials. The pivot axis 20 may be formed from a rod having the outer ends thereof flattened against the respective bending members 12 and 14.

In accordance with the present invention, the cable bender 10 further comprises means for rotating one of the bending members 12, 14 about the pivot axis 20. In this embodiment, the rotating means comprises a ratchet wrench 22 fixed to one of the bending members 14 at the wrench shaft 24. In a well known manner, the ratchet wrench 22 includes a switch 26 which provides means for fixing the lever in a set position when rotational force is applied in one direction, as the direction indicated by arrow 28 in FIG. 1, and further allows the wrench 22 to rotate freely when rotational force is applied in a direction 30 opposite to the one direction 28. The ratchet wrench 22 thus serves as a lever spaced from the pivot axis 20.

The cable bender 10 further includes another lever 32 fixed to the other bending member 12, as by a stud 34 extending from the bending member. In operation, the cable is fitted underneath the cable shoes 16 and 18. The operator then firmly grasps the lever 32 in one hand, and operates the ratchet wrench in a well known manner thereby causing the bending member 14 to rotate about the pivot axis 20 and bend the cable as desired. The use of the ratchet wrench 22 allows the operator to continuously change the position of leverage by rotating the wrench handle in the direction 30.

Figure 2:
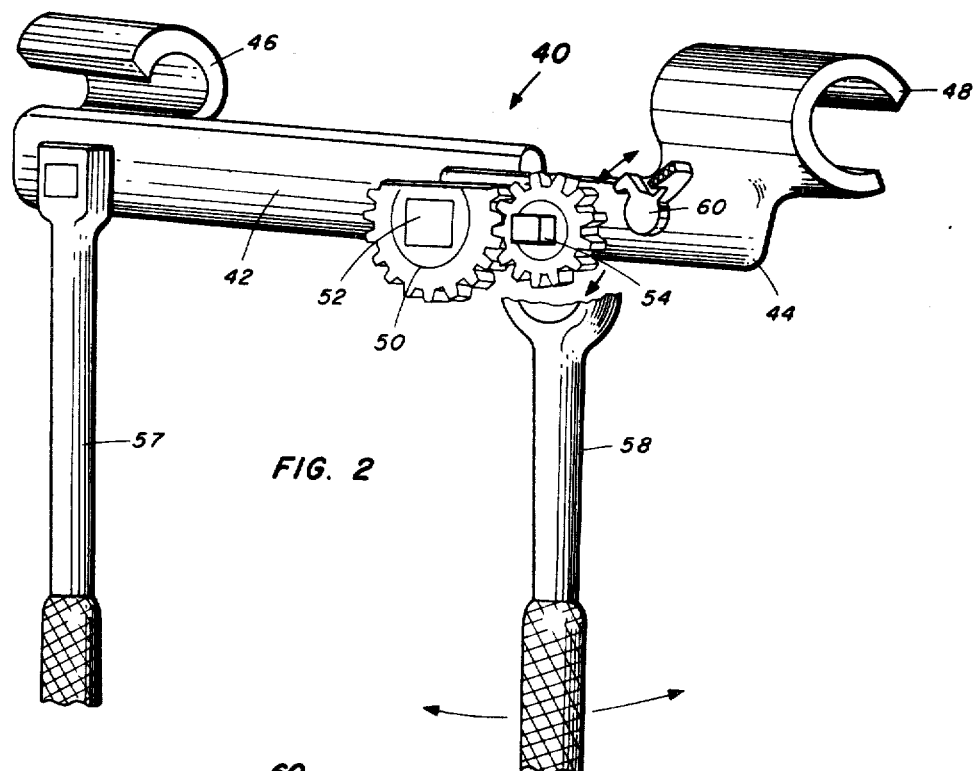
FIG. 2 is a perspective view of another embodiment of a cable bender in accordance with the present invention.

A second embodiment of a cable bender in accordance with the present invention is shown in FIG. 2 and described with reference thereto.

The bender, referred to generally as 40, also includes two bending members 42 and 44 having respective cable shoes 46 and 48, the bending members 42, 44 being rotatably joined together about a pivot axis 52 in a manner similar to the cable bender 10 shown in FIG. 1.

The cable bender 40 in FIG. 2 further includes a stationary gear 50 having a flat portion across the top thereof to allow cable to be inserted under the shoes 46, 48. The stationary gear 50 is fixed axial with the pivot axis 52.

Another gear 54 is rotatably mounted alongside one of the bending members 44, the teeth of the rotatable gear 54 being mashed with the stationary gear 50. The rotatable gear 54 includes a stud 56, or similar means, fixed thereon which is adapted to mate with a ratchet wrench 58. The cable bender 40 further includes a latch 60 adapted to engage the rotatable gear 54 and prevent rotation thereof. Another lever 57 is fixed to the other bending member 42.

When using the cable bender 40, the operator firmly grasps the fixed lever 57 in one hand, and rotates the ratchet wrench 58 in the direction in which force is applied so as to rotate the rotatable gear 54. The teeth of the rotatable gear 54 mesh with those of the stationary gear 50, and cause rotation of the bending member 44 about the pivot axis 52.

Figure 3:
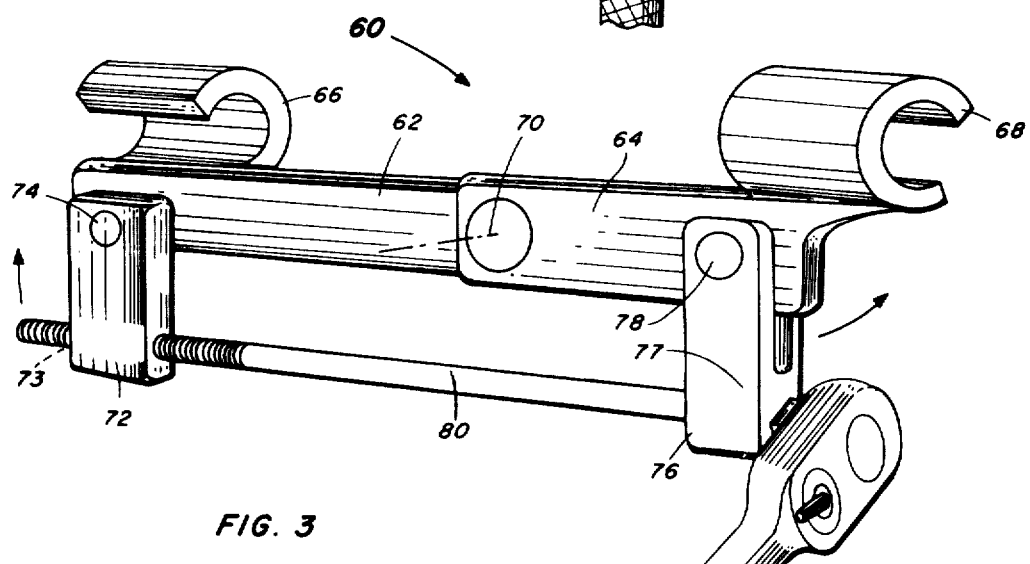
FIG. 3 is a third embodiment of a cable bender in accordance with the present invention.

Yet another embodiment of a cable bender in accordance with the present invention is shown in FIG. 3 and referred to generally as 60. The cable bender 60 includes two bending members 62, 64 having respective cable shoes 66 and 68, and being rotatably joined together about a pivot axis 70.

The cable bender 60 includes a first bracket 72 pivotably mounted at 74 on the bending member 62, and a second bracket 76 pivotably mounted at 78 on the other bending member 64. Each bracket 72, 76 includes a respective opening 73, 77, one of which is threaded. A threaded rod 80 extends through the openings 73, 77, with a ratchet wrench 82 attached at an outer end of the rod 80.

In use, the ratchet wrench 82 is rotated, causing the threaded rod 80 to pull the bracket 72 towards the bracket 76 and thereby effect rotation of the bending members 62, 64 about the pivot axis 70.

Figure 4:
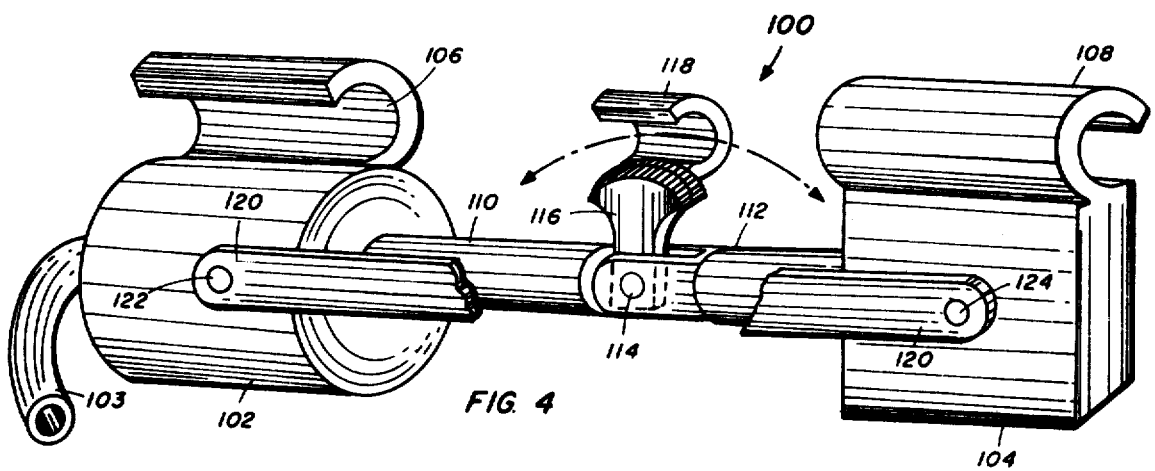
FIG. 4 is a perspective view of a cable bender utilizing hydraulic actuation means.

A hydraulically operated cable bender is shown in FIG. 4 and described with reference thereto.

The cable bender, referred to generally as 100, includes a first bending member 102 which may comprise a hydraulic cylinder having a hose for applying hydraulic pressure thereto in a well known manner. A variable length shaft 110 extends out of the hydraulic cylinder 102, and is adapted to be driven in a direction away from the cylinder upon exertion of hydraulic pressure therein. A cable shoe 106 is mounted on the hydraulic cylinder 102.

The cable bender 100 further comprises a second bending member 102 including a cable shoe 108 mounted thereon. The second bending member 104 further comprises a shaft 112 which is pivotably joined to the variable length hydraulic shaft 110 at a pivot axis 114. A bending knuckle 116 is pivotably joined with the shafts 110, 112 at the pivot axis 114. The joinder of the shafts 110, 112 and the bending knuckle 116 may be made by utilizing tongue-and-groove techniques well known to those in the machinist art. A rotatable cable shoe 118 is fixed to the bending knuckle 116.

The cable member 100 further includes a tie arm 120 pivotably joined to the hydraulic cylinder 102 and the bending member 104 at respective pivot points 122, 124. Preferably, the tie arm and the respective shafts 110, 112 all lie in a common plane which is normal to the direction in which the cable is to be bent.

Figure 5:
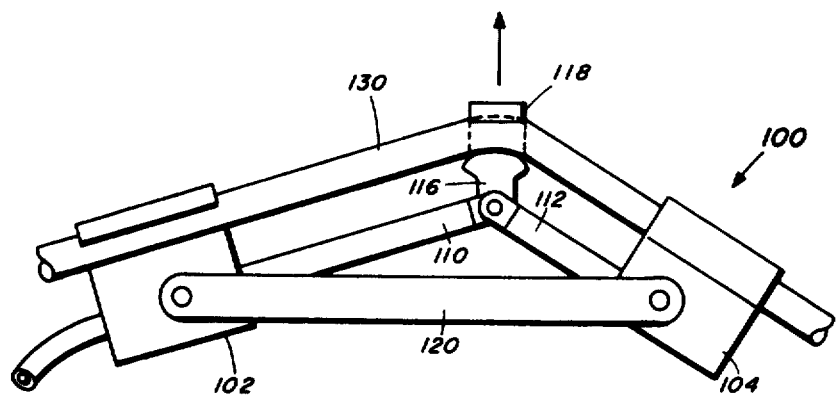
FIGS. 5 and 6 are side views illustrating the operation of the embodiment of FIG. 4.
Figure 6:
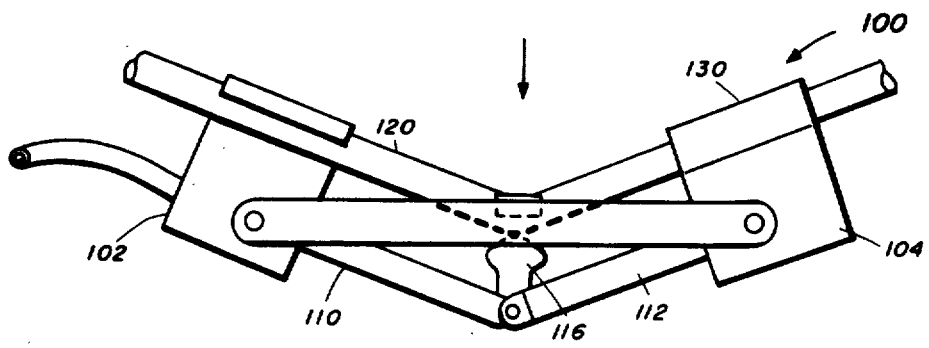

Operation of the cable bender 100 will be described with references to FIGS. 5 and 6. Noting FIG. 5, at the instant hydraulic pressure is applied to a hydraulic cylinder 102, the operator presses in an upward direction normal to the pivot axis and at the joinder between the shafts 110, 112. As the variable length shaft 110 extends out of the hydraulic cylinder, the bending knuckle is forced upward in a direction normal to the tie arm 120, causing bending of the cable 130. In a similar manner, the cable may be bent in a direction opposite to that shown in FIG. 5. Noting FIG. 6, the operator applies a downward pressure at the time hydraulic fluid is directed into the hydraulic cylinder 102, causing the variable length arm to extend in a downward direction and thereby bend the cable 130 in the manner shown in FIG. 6.

I claim:

1. A power bender for electrical cable and the like, comprising:
   a hydraulic cylinder having a shaft extending axially into said cylinder, said shaft movable responsive to hydraulic pressure within said cylinder;
   a first bending shoe with said cylinder and shaft combination and opened along one side in a direction substantially parallel with said shaft;
   a second bending shoe spaced from, and pivotal with respect to said shaft about a pivot axis between said second bending shoe and said shaft, said pivot axis extending substantially normal to the axis of said shaft, said second bending shoe opened along a second side opposing said first side in a direction substantially parallel with said shaft;
   a bending knuckle adjacent said pivot axis and between said first and second bending shoes;
   a tie arm pivotably coupled at one end to said hydraulic cylinder and pivotably coupled at the other end to said second bending shoe at a point on said second bending shoe spaced from said pivot axis; and wherein
   cable to be bent is inserted in said first and second bending shoes by placing said cable across said bending knuckle at a slight angle with respect to the axis of said shaft and thereafter rotating either said cable or said bender slightly so as to align said cable within said first and second bending shoe in a direction substantially parallel with the axis on said shaft, and wherein said cable may subsequently be bent by applying internal hydraulic pressure within said cylinder, causing said shaft to extend from said cylinder and cooperate with said tie arm to drive said second bending shoe in a predetermined curved path about said pivot axis.

2. The power bender recited in claim 1 wherein said tie arm extends between said hydraulic cylinder and said second bending shoe along said one side.

3. The power bender recited in claim 1 wherein said first and second extending shoes are substantially cylindrical, with said open sides thereof extending parallel with the axis of the respective cylindrical form.

* * * * *